United States Patent Office 3,721,666
Patented Mar. 20, 1973

3,721,666
1 - (PHENYL OR PYRIDYL) - 4 - (ALKYL OR ALKENYL)-3H- 1,4 - BENZODIAZEPINE-2,5-(1H,4H)-DIONES
Karl-Heinz Weber, Gau-Algesheim, Karl Zeile and Peter Danneberg, Ingelheim am Rhein, Rolf Giesemann, Bingen, Adolf Bauer and Herbert Merz, Ingelheim am Rhein, and Franz Josef Kuhn, Bingen, Germany, assignors to Boehringer G.m.b.H., Ingelheim am Rhein, Germany
No Drawing. Continuation-in-part of applications Ser. No. 777,193, Nov. 19, 1968, and Ser. No. 24,837, Apr. 1, 1970. This application Nov. 12, 1971, Ser. No. 198,429
Claims priority, application Germany, Apr. 9, 1969, P 19 18 072.4
Int. Cl. C07d 53/06
U.S. Cl. 260—239.3 D   11 Claims

ABSTRACT OF THE DISCLOSURE

Compounds of the formula

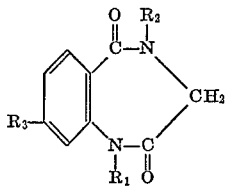

wherein
$R_1$ is

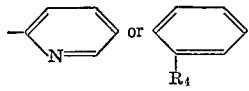

where $R_4$ is hydrogen, halogen, nitro or trifluoromethyl, $R_2$ is alkyl of 1 to 4 carbon atoms or allyl, and $R_3$ is chlorine, bromine, nitro, trifluoromethyl or cyano, which are useful as psychosedatives and anticonvulsives.

This is a continuation-in-part of copending applications Ser. No. 777,193, filed Nov. 19, 1968 now abandoned, and Ser. No. 24,837, filed Apr. 1, 1970, now abandoned.

This invention relates to novel 1-(phenyl or pyridyl)-4-(alkyl or allyl) - 3H - 1,4-benzodiazepine-2,5-[1H,4H]-diones, as well as to various methods of preparing these compounds.

More particularly, the present invention relates to a novel class of 1,4-benzodiazepine-2,5-diones represented by the formula

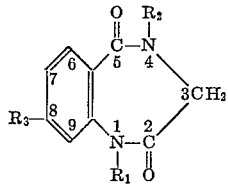

wherein
$R_1$ is

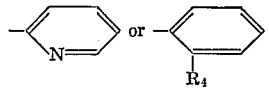

where $R_4$ is hydrogen, halogen, nitro or trifluoromethyl, $R_2$ is alkyl of 1 to 4 carbon atoms or allyl, and $R_3$ is chlorine, bromine, nitro, trifluoromethyl or cyano.

In addition, the present invention relates to a novel process for the preparation of a compound of the Formula I above.

More specifically, the compounds of the Formula I may be prepared by the following methods:

METHOD A

By reacting a 3H-1,4-benzodiazepine-2,5-dione of the formula

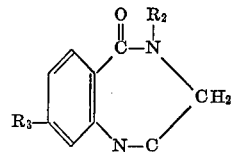

wherein $R_2$ and $R_3$ have the same meanings as in Formula I and Y is hydrogen or an alkali metal, with a halide of the formula $$X\text{—}R_1 \qquad (III)$$

wherein $R_1$ has the same meanings as in Formula I and X is halogen, at elevated temperatures and in the presence of a copper catalyst.

Suitable copper catalysts are powdered copper, cupric oxide (CuO), cuprous salts, cupric salts and mixtures of any of these.

The reaction is carried out in a liquid medium. The liquid medium may be provided either by a sufficient excess of the halide of the Formula III above the stoichiometrically required amount needed for reaction with the reactant of the Formual II, or by a polar aprotic solvent such as dimethylformamide, dimethylsulfoxide or hexamethylphosphoric triamide.

If the reaction is performed in a polar aprotic solvent medium, the halide of the Formula III is provided in an amount corresponding to the calculated stoichiometric quantity required for reaction with the reactant of the Formula II.

The optimum reaction temperature depends largely upon the reactivities of the starting compounds and generally lies between 90 and 180° C.

In those instances where the starting compound of the Formula II is one wherein Y is hydrogen, it is necessary to add to the reaction mixture an inorganic or organic base in order to tie up or neutralize the hydrogen halide released by the reaction. Examples of suitable inorganic or organic bases are alkali metal carbonates, alkali metal bicarbonates and particularly alkali metal acetates, especially potassium acetate. The base is provided in an amount corresponding to the quantity needed to tie up or neutralize the theoretical amount of hydrogen halide released or in slight excess thereover.

In those instances where the reaction according to the present invention yields a compound of the Formula I wherein $R_2$ is alkenyl, this substituent may, if desired, be converted into the corresponding alkyl substituent by hydrogenation pursuant to well known methods.

The starting compounds of the Formula II may be prepared by various methods described in the literature for the preparation of 1,4-benzodiazepine-2,5-diones. In the present case they were prepared by hydrogenating the corresponding o-nitro - N - hydrocarbyl-hippuric acid and cyclizing the o-amino-N-hydrocarbyl-hippuric acid intermediate, pursuant to the following reaction sequence:

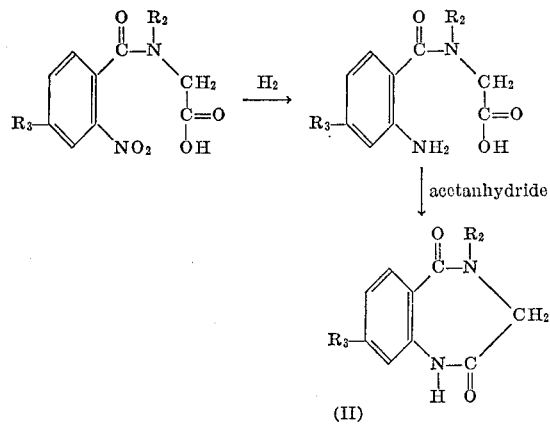

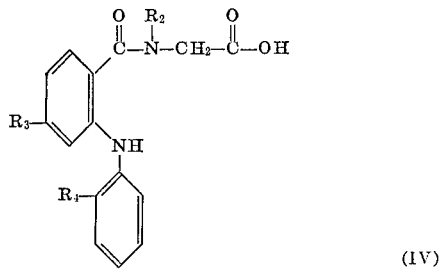

(II)

wherein $R_2$ and $R_3$ have the same meanings as in Formula I.

METHOD B

For the preparation of a compound of the Formula I wherein $R_1$ is a phenyl substituent:

(a) By converting an anthranilic acid derivative of the formula

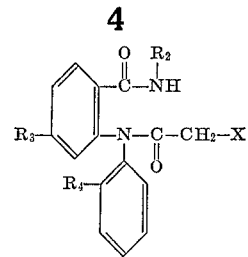

(IV)

wherein $R_2$, $R_3$ and $R_4$ have the same meanings as in Formula I, into the corresponding acid halide with the aid of a halogenating agent, and subsequently, if necessary, treating the reaction product with a tertiary organic base, or (b) Subjecting the anthranilic acid derivative of the Formula IV to direct ring closure with the aid of an acylanhydride or an acylhalide.

The reaction of an anthranilic acid derivative of the Formula IV with thionylchloride, phosphorus pentachloride, phosphorus trichloride or another suitable halogenating agent to form the corresponding acid halide is preferably carried out in the presence of an inert organic solvent, such as benzene, toluene, xylene or a mixture of any of these solvents with dimethylformamide. The effective reaction temperature depends upon the particular starting compound which is used and ranges between room temperature and the reflux temperature of the particular solvent or solvent mixture which is employed. In most instances the acid halide formed thereby as an intermediate undergoes ring closure spontaneously, accompanied by release of hydrogen halide. In some instances, however, the ring closure must be initiated by treatment with a tertiary organic base, such as pyridine, but the intermediate acid halide does not need to be isolated.

The ring closure reaction with the aid of an acylanhydride or an acylhalide is preferably carried out in benzene solution at reflux temperature, but it also proceeds without a solvent at an elevated temperature.

METHOD C

For the preparation of a compound of the Formula I wherein $R_1$ is a phenyl substituent:

By heating a diamide of the formula

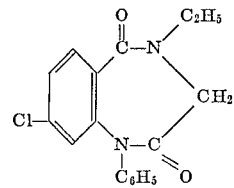

(V)

wherein $R_2$, $R_3$ and $R_4$ have the same meanings as in Formula I and X is halogen, with an alkali metal alcoholate, such as sodium ethylate or potassium ethylate, in the presence of an inert organic solvent, such as anhydrous benzene, toluene or xylene, preferably at the reflux temperature of the particular solvent which is used.

A compound of the Formula IV may be obtained either by reacting a corresponding phenylisotoic acid anhydride with an N-alkylamino-acid ester, or by aminolysis of a corresponding phenylanthranilic acid chloride and subsequent hydrolysis.

A compound of the Formula V may be obtained by amidation of a corresponding phenylisatoic acid anhydride or phenylanthranilic acid chloride with a monoalkylamine, and subsequent reaction of the resulting amide with a haloacyl halide, preferably in the presence of benzene and an equivalent amount of an organic tertiary base, such as pyridine.

The following examples further illustrate the present invention and will enable others skilled in the art to understand it more completely. It should be understood, however, that the invention is not limited solely to the particular examples given below.

Example 1.—4-ethyl-8-chloro-1-phenyl-3H-1,4-benzodiazepine-2,5-[1H,4H]-dione

A mixture consisting of 5 gm. of 4-ethyl-8-chloro-3H-1,4-benzodiazepine-2,5-[1H,4H]-dione, 5 gm. of powdered copper, 2.5 gm. of potassium acetate and 100 ml. of bromobenzene was refluxed for six hours. Thereafter, the reaction mixture was diluted with methylene chloride and vacuum-filtered through diatomaceous earth, the filtrate was extracted with dilute aqueous ammonia to remove residual cuprous chloride, and the methylene chloride was evaporated. The residue was admixed with isopropyl ether, whereby a crystalline product separated out which was collected and recrystallized from a mixture of toluene and isopropyl ether. 5.2 gm. of colorless crystalline 4 - ethyl-8-chloro-1-phenyl-3H-1,4-benzodiazepine-2,5-[1H,4H]-dione, M.P. 190–192° C. of the formula were obtained.

Example 2.—4-ethyl-8-chloro-1-(o-chloro-phenyl)-3H-1,4-benzodiazepine-2,5-[1H,4H]-dione A mixture consisting of 10 gm. of 4-ethyl-8-chloro-3H-1,4-benzodiazepine-2,5-[1H,4H]-dione, 5 gm. of powdered copper, 1 gm. of cupric sulfate ($CuSO_4$) and 100 ml. of o-chloro-bromobenzene was heated to 90° C. While maintaining that temperature, 4.5 gm. of potassium acetate was added in small portions to the hot mixture over a period of 30 minutes. Thereafter, the reaction mixture was heated for nine hours more, while stirring, at 170–180° C. Subsequently, the reaction mixture was worked up as described in Example 1. The raw product was dissolved in methylene chloride, the solution was introduced into a column of 400 gm. diatomaceous earth slurried with methylene chloride, and the product was eluted with a mixture of methylene chloride and methanol (97:3). The first eluate fraction was freed from solvent, and the residue was recrystallized from isopropylether, yielding 2.5 gm. of 4-ethyl-8-chloro-1-(o-chlorophenyl) - 3H - 1,4 - benzodiazepine-2,5-[1H,4H]-dione, M.P. 162–164° C.

Example 3.—4-ethyl-8-chloro-1-(pyridyl-2')-3H-1,4-benzodiazepine-2,5-[1H,4H]-dione A mixture consisting of 6 gm. of 4-ethyl-8-chloro-3H-1,4-benzodiazepine-2,5-[1H,4H]-dione, 4.5 gm. of powdered copper and 60 ml. of o-bromo-pyridine was heated to 90° C. while stirring, and, while maintaining that temperature and stirring, a total of 2.6 gm. of potassium acetate were added in small portions over a period of one hour. Thereafter, the reaction mixture was stirred for 30 minutes more at 90–95° C. The reaction mixture was then worked up as described in Example 1, and the raw product was recrystallized from a mixture of isopropyl ether and methylene chloride. 3.3 gm. of 4-ethyl-8-chloro-1-(pyridyl-2') - 3H - 1,4 - benzodiazepine-2,5-[1H,4H]-dione, M.P. 229–230° C., of the formula

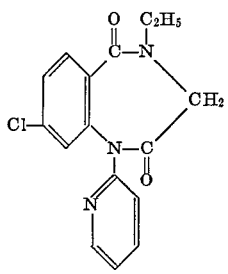

were obtained.

Example 4

Using a procedure analogous to that described in Example 1, 4-methyl-8-chloro - 1 - phenyl-3H-1,4-benzodiazepine-2,5-[1H,4H]-dione, M.P. 209–210° C., was prepared from 4-methyl - 8 - chloro-3H-1,4-benzodiazepine-2,5-[1H,4H]-dione and bromobenzene.

Example 5

Using a procedure analogous to that described in Example 1, 4-isopropyl-8-chloro - 1 - phenyl-3H-1,4-benzodiazepine-2,5-[1H,4H]-dione, M.P. 178–180° C., was prepared from 4-isopropyl-8-chloro-3H-1,4-benzodiazepine-2,5-[1H,4H]-dione and bromobenzene.

Example 6

Using a procedure analogous to that described in Example 2, 4-methyl-8-chloro-1-(o-chlorophenyl)-3H-1,4-benzodiazepine-2,5-[1H,4H]-dione, M.P. 165–167° C., was prepared from 4-methyl-8-chloro-3H-1,4-benzodiazepine-2,5-[1H,4H]-dione and o-chloro-bromobenzene.

Example 7

Using a procedure analogous to that described in Example 1, 4-n-butyl-8-chloro-1-phenyl-3H-1,4-benzodiazepine-2,5-[1H,4H]-dione, M.P. 153–154° C., was prepared from 4 - n - butyl - 8-chloro-3H-1,4-benzodiazepine-2,5-[1H,4H]-dione and bromobenzene.

Example 8

Using a procedure analogus to that described in Example 1, 4-allyl-8-chloro-1-phenyl-3H-1,4-benzodiazepine-2,5-[1H,4H]-dione, M.P. 128–130° C., was prepared from 4 - allyl - 8 - chloro-3H-1,4-benzodiazepine-2,5-[1H,4H]-dione and bromobenzene.

Example 9

Using a procedure analogous to that described in Example 2, 4-ethyl-8-chloro-1-(o-nitrophenyl)-3H-1,4-benzodiazepine-2,5-[1H,4H]-dione, M.P. 199–201° C., of the formula

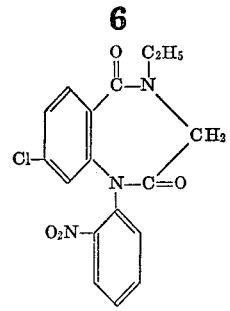

was prepared from 4-ethyl-8-chloro-3H-1,4-benzodiazepine-2,5-[1H,4H]-dione and o-nitrochlorobenzene.

Example 10

Using a procedure analogous to that described in Example 2, 4 - ethyl - 8-chloro-1-(o-fluorophenyl)-3H-1,4-benzodiazepine-2,5-[1H,4H]-dione, M.P. 165–167° C., was prepared from 4-ethyl-8-chloro-3H-1,4-benzodiazepine-2,5-[1H,4H]-dione and o-fluorochlorobenzene.

Example 11

Using a procedure analogous to that described in Example 1, 4 - ethyl - 8 - nitro-1-phenyl-3H-1,4-benzodiazepine-2,5-[1H,4H]-dione, M.P. 155–157° C., was prepared from 4 - ethyl - 8 - nitro-3H-1,4-benzodiazepine-2,5-[1H,4H]-dione and bromobenzene.

Example 12

Using a procedure analogous to that described in Example 1, 4 - ethyl - 8 - cyano-1-phenyl-3H-1,4-benzodiazepine-2,5-[1H,4H]-dione, M.P. 186–187° C., was prepared from 4 - ethyl - 8 - cyano-3H-1,4-benzodiazepine-2,5-[1H,4H]-dione and bromobenzene.

Example 13

Using a procedure analogous to that described in Example 1, 4 - ethyl - 8 - trifluoromethyl-1-phenyl-3H-1,4-benzodiazepine-2,5-[1H,4H]-dione, M.P. 169° C., was prepared from 4 - ethyl - 8-trifluoromethyl-3H-1,4-benzodiazepine-2,5-[1H,4H]-dione and bromobenzene.

Example 14

Using a procedure analogous to that described in Example 2, 4 - ethyl - 8 - trifluoromethyl-1-(o-trifluoromethylphenyl) - 3H - 1,4 - benzodiazepine-2,5-[1H,4H]-dione, M.P. 226° C., was prepared from 4-ethyl-8-trifluoromethyl - 3H - 1,4 - benzodiazepine - 2,5-[1H,4H]-dione and o-trifluoromethyl-bromobenzene.

Example 15

Using a procedure analogous to that described in Example 2, 4 - ethyl - 8-trifluoromethyl-1-(o-fluoro-phenyl)- 3H - 1,4 - benzodiazepine-2,5-[1H,4H]-dione, M.P. 155° C., was prepared from 4-ethyl-8-trifluoromethyl-3H-1,4-benzodiazepine-2,5-[1H,4H]-dione and o - fluoro-bromobenzene.

Example 16

Using a procedure analogous to that described in Example 1, 4 - ethyl - 8 - bromo-1-phenyl-3H-1,4-benzodiazepine-2,5-[1H,4H]-dione, M.P. 205° C., was prepared from 4 - ethyl - 8 - bromo-3H,1,4-benzodiazepine-2,5-[1H,4H]-dione and bromobenzene.

The surprising aspect of method A, that is, the process according to the present invention, is that the ring structure of 3H-1,4-benzodiazepine-2,5-[1H,4H]-dione, which is known to be rather unstable under severe conditions, survives the relatively harsh reaction conditions.

Example 17.—1 - phenyl - 4 - methyl-8-chloro-3H,1,4-benzodiazepine-2,5-[1H,4H]-dione by method B(a).

7.36 gm. (0.03 mol) of carboxymethyl-methylamido-N-phenyl-4-chloroanthranilic acid were dissolved in a mixture of 50 ml. of benzene and 5 ml. of dimethylformamide, and the solution was admixed in the cold, while stirring, within ten minutes with a solution of 3.1 gm.

of thionylchloride in 10 ml. of benzene. The temperature rose to 35° C. Stirring was continued for two hours at room temperature, the solvent was evaporated, the residue was taken up in methylene chloride, and the solution was shaken with an aqueous sodium bicarbonate solution in order to remove the acid components. The dried methylene chloride phase was evaporated, and the residue was recrystallized from methylenechloride/isopropylether. 3.2 gm. of 1-phenyl-4-methyl-8-chloro-3H-1,4-benzodiazepine-2,5-[1H,4H]-dione, M.P. 209–210° C., of the formula

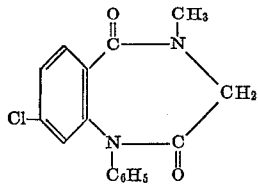

were obtained.

The starting material was obtained as follows:

74 gm. (0.03 mol) of phenyl-4-chloroanthranilic acid were suspended in 800 ml. of petroleum ether. While stirring, 62.5 gm. of phosphorus pentachloride were added to the suspension, and then the mixture was heated to about 50° C. The reaction began spontaneously and ended after 15 minutes. A clear yellow solution was formed over a small quantity of insoluble matter. The solution was filtered while hot, and after cooling the filtrate on ice, long, yellow needles were obtained which were recrystallized from isopropylether. Yield: 90–95% of theory of the acid chloride, M.P. 100–101° C.

0.2 mol (53 gm.) of acid chloride were dissolved in 500 ml. of methylenechloride. While stirring vigorously, a solution of 0.2 mol (26.2 gm.) of ethyl N-methylaminoacetate and 16.8 gm. of sodium bicarbonate in 50 ml. of water was added. After approximately 30 minutes the reaction was finished. The methylenechloride phase was separated, dried and evaporated. 75 gm. of crude ester were obtained, which were dissolved in 200 ml. of ethanol. A solution of 35 gm. of caustic potash in 200 ml. of water was added, and the mixed solution was boiled for 15 minutes under reflux. The alcohol was distilled off, the residue was diluted with water, and the aqueous solution was acidified with hydrochloric acid and extracted with methylenechloride. After drying and evaporating the methylenechloride extract solution, 75 gm. of carboxymethyl-methylamido-N-phenyl-4-chloro-anthranilic acid were obtained.

Example 18.—1-phenyl-4-ethyl-8-chloro-3H-1,4-benzodiazephine-2,5[1H,4H]dione by method B(a)

38.4 gm. of carboxymethyl-ethylamido-N-phenyl-4-chloroanthranilic acid were dissolved in 250 ml. of benzene. 50 ml. of acetic anhydride were added, and the mixture was refluxed for one hour. The acid components were extracted with sodium bicarbonate solution, and the benzene phase was dried and evaporated. The residue was recrystallized from methylenechloride-petroleum ether. Yield: 26 gm. of a compound having a M.P. of 193–195° C., which had the structural formula

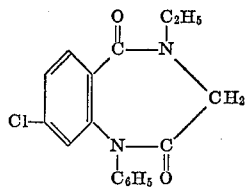

Example 19.—1-phenyl-4-ethyl-8-chloro-3H-1,4-benzodiazepine-2,5[1H,4H]dione by method B(b)

1.2 gm. of sodium methylate were suspended in 120 ml. of toluene. 20 ml. of toluene were distilled off, 7.0 gm., (=20 m-mol) of 2-[(N-chloroacyl-N-phenyl)-amino]-4-chloroethylbenzamide were added and, while stirring, the mixture was refluxed for two hours. The reaction mixture was extracted with water several times, and the toluene phase was dried and evaporated. After digestion of the residue with isopropylether, vacuum filtration and recrystallization from methylenechloride-petroleumether, the solid residue yielded 4 gm. (65% of theory) of 1-phenyl - 4 - ethyl-8-chloro-3H-1,4-benzodiazepine-2,5-[1H,4H]-dione, melting point 193–195° C.

The starting material was obtained as follows:

80 gm. (0.3 mol) of 3-chloro-N-phenylanthranilic acid chloride were dissolved in 400 ml. of methylenechloride and, while stirring and cooling, 110 ml. of an aqueous 25% ethylamine solution were added dropwise. Stirring was continued for 30 minutes, the methylenechloride phase was seeparated, washed with water, separated again, dried and evaporated, and the residue was recrystallized from isopropylether. Yield: 74 gm. (90% of theory), M.P. 101–102° C.

17.4 gm. (0.06 mol) of the product thus obtained were dissolved in a mixture of 350 ml. of benzene and 4.8 ml. of pyridine. While stirring, a solution of 6.8 gm. of pure chloroacetylchloride in 20 ml. of benzene was added, and the temperature of the mixed solution was kept at 50° C. for 24 hours. The reaction mixture was washed with water, then with an aqueous sodium carbonate solution and again with water, then dried and evaporated in vacuo. The residue was recrystallized from methylenechloride-isopropylether. Yield of 2-[(N-chloroacyl-N-phenyl)-amino]-4-chloro-ethyl-benzamide: 7.8 gm. (38% of theory), M.P. 167–168° C.

Example 20

Using a procedure analogous to that described in Example 17, 1-phenyl-4-isopropyl-8-chloro-3H-1,4-benzodiazepine-2,5-[1H,4H]-dione, M.P. 178–180° C., of the formula

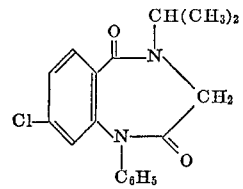

was prepared from carboxymethyl-isopropylamido-N-phenyl-4-chloro-anthranilic acid.

Example 21

Using a procedure analogous to that described in Example 17, 1-(2'-chloro-phenyl)-4-methyl-8-chloro-3H-1,4-benzodiazepine-2,5-[1H,4H]-dione, M.P. 165–167° C., of the formula

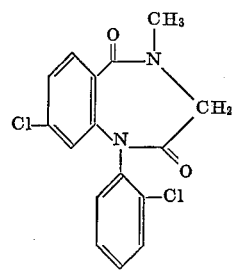

was prepared from carboxymethyl-methylamido-N-(2'-chlorophenyl)-4-chloro-anthranilic acid.

Example 22

Using a procedure analogous to that described in Example 17, 1-(2'-chloro-phenyl)-4-ethyl-8-chloro-3H-1,4- benzodiazepine-2,5-[1H,4H]-dione, M.P. 162–164° C., of the formula

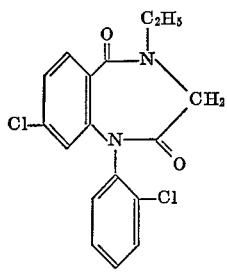

was prepared from carboxymethyl-ethylamido-N-(2'-chlorophenyl-4-chloro-anthranilic acid.

Example 23

Using a procedure analogous to that described in Example 17, 1-phenyl-4-n-butyl-8-chloro-3H-1,4-benzodiazepine-2,5,-[1H,4H]-dione, M.P. 153–154° C., of the formula

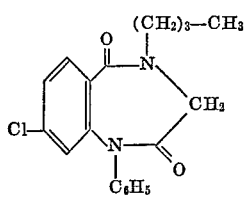

was prepared from carboxymethyl-n-butylamido-N-phenyl-4-chloro-anthranilic acid.

Example 24

Using a procedure analogous to that described in Example 17, 1-phenyl-4-allyl-8-chloro-3H-1,4-benzodiazepine-2,5-[1H,4H]-dione, M.P. 128–130° C., of the formula

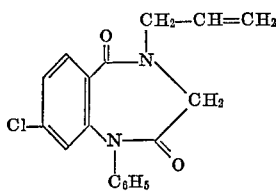

was prepared from carboxymethyl-allylamindo-N-phenyl-5-chloroanthranilic acid.

Example 25

Using a procedure analogous to that described in Example 17, 1-phenyl-4-ethyl-8-nitro-3H-1,4-benzodiazepine-2,5-[1H,4H]-dione, M.P. 155–157° C., of the formula

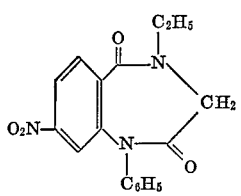

was prepared from carboxymethyl-ethylamido-N-phenyl-4-nitroanthranilic acid.

Example 26

Using a procedure analogous to that described in Example 17, 1-phenyl-4-ethyl-8-trifluoromethyl-3H-1,4-benzodiazepine-2,5-[1H,4H]-dione, M.P. 169° C., of the formula

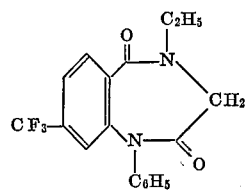

was prepared from carboxymethyl-ethylamido-N-phenyl-4-trifluoromethyl-anthranilic acid.

Example 27

Using a procedure analogous to that described in Example 17, 1-phenyl-4-ethyl-8-cyano-3H-1,4-benzodiazepine-2,5-[1H,4H]-dione, M.P. 186–187° C., of the formula

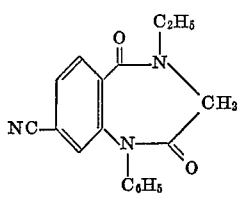

was prepared from carboxymethyl-ethylamido-N-phenyl-4-cyano-anthranilic acid.

The compounds according to the present invention, that is, those embraced by Formula I above, have useful pharmacodynamic properties. More particularly, the compounds of the invention exhibit very effective psychosedative and anticonvulsive activities in warm-blooded animals, such as mice, rats, cats and dogs, as evidenced by the results of the following tests.

The compounds were tested in adult laboratory mice for psychosedative and anticonvulsive activities, as well as for acute toxicity by means of the following standard pharmacological tests:

(a) Slide test.—After oral administration of a given dose of the compound under investigation, the test animals were placed on a smooth metal plate which was inclined at an angle of 35° from the horizontal, and the number of animals was recorded which, because of the sedative effect of the test compound, could not maintain their hold and fell off. The test procedure was repeated at several dosage levels, and from the data thus obtained the median effective sedative dose ($ED_{50}$) was graphically calculated, i.e. the dose which causes 50% of the animals to slide off the plate.

(b) Ataxia.—After oral administration of a given dose of the compound under investigation the animals were observed over a period of time for ataxia, i.e. lack of coordinated movements of the extremities, and the number of animals exhibiting ataxia was recorded. From the values thus obtained at various dosage levels, the median ataxic dose ($AD_{50}$) was graphically calculated, i.e. the dose which causes 50% of the animals to exhibit ataxic effects.

(c) Maximal electroshock (anticonvulsive activity).—The untreated test animals were shocked with a definite current, using eye-electrodes. When the maximal electroshock was applied, 100% of the untreated animals exhibited the maximal tetanic convulsion. Thereafter, a given dose of the compound under investigation was perorally administered to the test animals, and the maximal electroshock was again applied. If the test compound exhibited anticonvulsive properties, the maximal tetanic convulsion was entirely or partially prevented. The test procedure was repeated at various dosage levels, and from the values thus obtained the median effective anticonvulsive dose (anticonvulsive $ED_{50}$) was graphically determined, i.e. the dose which prevented the maximal tetanic convulsion in 50% of the test animals.

(d) Toxicity.—The median lethal dose ($LD_{50}$) for each compound was graphically determined by the method of Litchfield and Wilcoxon, J. of Pharmacol. exptl. Therap., vol. 96, p. 99 (1949).

The following table shows the results obtained from the above described pharmacological tests.

TABLE

| Compound | Slide test $ED_{50}$, mg./kg. | Ataxia $AD_{50}$, mg./kg. | Anti-convul-sive $ED_{50}$, mg./kg. | $LD_{50}$, mg./kg. |
|---|---|---|---|---|
| 1-phenyl-4-methyl-8-chloro-3H-1,4-benzodiazepine-2,5-[1H,4H]-dione | <11 | 91 | 70 | >2,700 |
| 1-phenyl-4-ethyl-8-chloro-3H-1,4-benzodiazepine-2,5-[1H,4H]-dione | 27 | 35 | 86 | >2,500 |
| 1-(2-chlorophenyl)-4-methyl-8-chloro-3H-1,4-benzodiazepine-2,5-[1H,4H]-dione | 27 | 34 | 190 | >3,000 |
| 1-(2-chlorophenyl)-4-ethyl-8-chloro-3H-1,4-benzodiazepine-2,5-[1H,4H]-dione | 60 | 29 | 45 | >3,100 |
| 1-phenyl-4-n-butyl-8-chloro-3H-1,4-benzodiazepine-2,5-[1H,4H]-dione | 50 | 48 | 230 | >3,090 |
| 1-phenyl-4-ethyl-8-nitro-3H-1,4-benzodiazepine-2,5-[1H,4H]-dione | 9 | 14 | 70 | >2,900 |
| 1-phenyl-4-ethyl-8-cyano-3H-1,4-benzodiazepine-2,5-[1H,4H]-dione | | 44 | >305 | >1,000 |
| 4-ethyl-8-chloro-1-(pyridyl-2'-)-3H-1,4-benzodiazepine,2,5-[1H,4H]-dione | 16 | 31 | >316 | >2,850 |
| 4-ethyl-8-chloro-1-(2'-nitro phenyl)-3H-1,4-benzodiazepine-2,5-[1H,4H]-dione | 92 | 90 | >360 | >3,250 |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions suspensions, emulsions, syrups, suppositories and the like. One effective doage unit of the compounds according to the present invention is from 0.0166 to 1.66 mgm./kg. body weight, preferably from 0.083 to 0.833 mgm./kg. body weight.

The following examples illustrate a few pharmaceutical dosage unit compositions comprising a compound of the instant invention as an active ingredient and represent the best mode contemplated of putting the invention to practical use. The parts are parts by weight unless otherwise specified.

Example 28.—Coated pills

The pill core composition was compounded from the following ingredients:

| | Parts |
|---|---|
| 1 - (2'-chloro-phenyl)-4-ethyl-chloro-3H-1,4-benzodiazepine-2,5-[1H,4H]-dione | 10.0 |
| Lactose | 25.5 |
| Corn starch | 13.0 |
| Gelatin | 1.0 |
| Magnesium stearate | 0.5 |
| Total | 50.0 |

Compounding procedures: The benzodiazepine-dione compound was intimately admixed with the lactose and the corn starch, the mixture was moistened with an aqueous 10% solution of the gelatin, the moist mass was forced through a 1 mm.-mesh screen, and the resulting granulate was dried at 40° C. and again passed through the screen. The dry granulate was admixed with the magnesium stearate, and the mixture was pressed into 50 mgm.-pill cores, which were then coated in conventional manner with a thin shell consisting essentially of sugar, talcum, titanium dioxide and gum arabic. The coated pills were finally polished with beeswax. Each coated pill contained 10 mgm. of the benzodiazepine-dione compound and, when administered perorally to a warm-blooded animal of about 60 kg. body weight in need of such treatment, produced very good psychosedative and anticonvulsive effects.

Example 29.—Suppositories

The suppository composition was compounded from the following ingredients:

| | Parts |
|---|---|
| 1 - phenyl - 4-ethyl - 8 - chloro-3H-1,4-benzodiazepine-2,5-[1H,4H]-dione | 10.0 |
| Cocoa butter | 1690.0 |
| Total | 1700.0 |

Compounding procedure: The cocoa butter was melted and cooled to 40° C., and then the benzodiazepine-dione compound in finely powdered form was stirred in with the aid of an immersion homogenizer. The mixture was poured at 35° C. into cooled suppository molds, each holding 1700 mgm. of the mixture. Each suppository contained 10 mgm. of the benzodiazepine-dione compound and, when administered rectally to a warm-blooded animal of about 60 kg. body weight in need of such treatment, produced very good psychosedative and anticonvulsive effects.

Example 30.—Coated pills

The pill core composition was compounded from the following ingredients:

| | Parts |
|---|---|
| 1 - (pyridyl - 2') - 4-ethyl-8-chloro-3H-1,4-benzodiazepine-2,5-[1H,4H]-dione | 10.0 |
| Lactose | 25.5 |
| Corn starch | 13.0 |
| Gelatin | 1.0 |
| Magnesium stearate | 0.5 |
| Total | 50.0 |

Compounding procedure: The benzodiazepine-dione compound was intimately admixed with the lactose and the corn starch, the mixture was moistened with an aqueous 10% solution of the gelatin, the moist mass was forced through a 1 mm.-mesh screen, and the resulting granulate was dried at 40° C. and again passed through the screen. The dry granulate was admixed with the magnesium stearate, and the mixture was pressed into 50 mgm.-pill cores, which were then coated in conventional manner with a thin shell consisting essentially of sugar, talcum, titanium dioxide and gum arabic. The coated pills were finally polished with beeswax. Each coated pill contained 10 mgm. of the benzodiazepine-dione compound and, when administered perorally to a warm-blooded animal of about 60 kg. body weight in need of such treatment, produced very good psychosedative and anticonvulsive effects.

Example 31.—Suppositories

The suppository composition was compounded from the following ingredients:

| | Parts |
|---|---|
| 1 - (2' - nitro-phenyl)-4-ethyl-8-chloro-3H-1,4-benzodiazepine-2,5-[1H,4H]-dione | 10.0 |
| Cocoa butter | 1690.0 |
| Total | 1700.0 |

Compounding procedure: The cocoa butter was melted and cooled to 40° C., and then the benzodiazepine-dione compound in finely powdered form was stirred in with the aid of an immersion homogenizer. The mixture was poured at 35° C. into cooled suppository molds, each holding 1700 mgm. of the mixture. Each suppository contained 10 mgm. of the benzodiazepine-dione compound and, when administered rectally to a warm-blooded animal of about 60 kg. body weight in need of such treatment, produced very good psychosedative and anticonvulsive effects.

Analogous results were obtained when an equal amount of any one of the other compounds embraced by Formula I above was substituted for the particular benzodiazepine-dione compounds in Examples 28 through 31. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

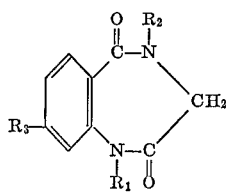

wherein
$R_1$ is

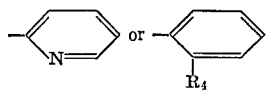

where $R_4$ is hydrogen, halogen, nitro or trifluoromethyl,
$R_2$ is alkyl of 1 to 4 carbon atoms or allyl, and
$R_3$ is chlorine, bromine, nitro, trifluoromethyl or cyano.

2. A compound according to claim 1, which is 1-(2'-chlorophenyl)-4-methyl - 8 - chloro-3H-1,4-benzodiazepine-2,5-[1H,4H]-dione.

3. A compound according to claim 1, which is 1-phenyl - 4 - ethyl - 8 - chloro - 3H - 1,4 - benzodiazepine-2,5-[1H,4H]-dione.

4. A compound according to claim 1, which is 1-phenyl - 4 - ethyl - 8 - nitro - 3H - 1,4 - benzodiazepine-2,5-[1H,4H]-dione.

5. A compound according to claim 1, which is 1-phenyl - 4 - ethyl - 8 - trifluoromethyl - 3H - 1,4 - benzodiazepine-2,5-[1H,4H]-dione.

6. A compound according to claim 1, which is 4-ethyl - 8 - chloro - 1 - (pyridyl - 2') - 3H - 1,4 - benzodiazepine-2,5-[1H,4H]-dione.

7. A compound according to claim 1, which is 4-ethyl - 8 - chloro - 1 - (o-nitro-phenyl) - 3H - 1,4 - benzodiazepine-2,5-[1H,4H]-dione.

8. A compound according to claim 1, which is 4-ethyl-8 - trifluoromethyl - 1 - (o-fluoro-phenyl) - 3H - 1,4-benzodiazepine-2,5-[1H,4H]-dione.

9. A compound according to claim 1, which is 4-ethyl-8 - bromo - 1 - phenyl - 3H - 1,4 - benzodiazepine - 2,5-[1H,4H]-dione.

10. A compound according to claim 1, which is 4-ethyl-8-trifluoromethyl - 1 - (o-trifluoromethylphenyl)-3H-1,4-benzodiazepine-2,5-[1H,4H]-dione.

11. A compound according to claim 1, which is 4-methyl - 8 - chloro - 1 - (o-chlorophenyl)-3H-1,4-benzodiazepine-2,5-[1H,4H]-dione.

References Cited
UNITED STATES PATENTS

| | | | |
|---|---|---|---|
| 3,173,912 | 3/1965 | Krapcho | 260—239.3 D |
| 3,244,698 | 4/1966 | Uskokovic et al. | 260—239.3 D |
| 3,261,828 | 7/1966 | Uskokovic et al. | 260—239.3 D |

FOREIGN PATENTS

| | | | |
|---|---|---|---|
| 1,124,133 | 8/1968 | Great Britain | 260—239.3 D |

OTHER REFERENCES

Iacobelli et al.: J. Het. Chem., vol. 2, pp. 323–5 (1965).

Neller: "Chemistry of Organic Compounds, 2nd Ed, pp. 435–436, 486–487 (Saunders) (1957).

Bernthsen: "Organic Chemistry," 1941 Ed., pp. 437–438 (Blackie).

Klingsberg: "Heterocyclic Compounds," "Pyridine and Derivatives" Part II, pp. 352–355 (Interscience) (1961); Part III, pp. 5–7 (Interscience) (1961).

HENRY R. JILES, Primary Examiner

R. T. BOND, Assistant Examiner

U.S. Cl. X.R.
424—244, 263

UNITED STATES PATENT OFFICE
CERTIFICATE OF CORRECTION

Patent No. 3,721,666     Dated March 20, 1973

Inventor(s) KARL-HEINZ WEBER, ET. AL.

It is certified that error appears in the above-identified patent and that said Letters Patent are hereby corrected as shown below:

Column 1, after line 14, insert -- application Austria, Nov. 24, 1967, A 10647/67 -- .

Signed and sealed this 22nd day of January 1974.

(SEAL)
Attest:

EDWARD M. FLETCHER, JR.
Attesting Officer

RENE D. TEGTMEYER
Acting Commissioner of Patents